United States Patent
Wang et al.

(10) Patent No.: US 10,997,252 B2
(45) Date of Patent: May 4, 2021

(54) METHODS, APPARATUSES, AND COMPUTER STORAGE MEDIA FOR DATA SEARCHING

(71) Applicant: EMC IP Holding Company LLC, Hopkinton, MA (US)

(72) Inventors: Ren Wang, Shanghai (CN); Yifan Huang, Shanghai (CN); Xiaolan Wang, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 91 days.

(21) Appl. No.: 16/146,857

(22) Filed: Sep. 28, 2018

(65) Prior Publication Data
US 2019/0384793 A1 Dec. 19, 2019

(30) Foreign Application Priority Data
Jun. 15, 2018 (CN) .......................... 2018106185404

(51) Int. Cl.
| G06F 7/00 | (2006.01) |
| G06F 16/9035 | (2019.01) |
| G06F 16/9038 | (2019.01) |
| G06F 16/903 | (2019.01) |
| G06F 17/11 | (2006.01) |
| G06F 16/901 | (2019.01) |

(52) U.S. Cl.
CPC ........ *G06F 16/9035* (2019.01); *G06F 16/901* (2019.01); *G06F 16/9038* (2019.01); *G06F 16/90335* (2019.01); *G06F 17/11* (2013.01)

(58) Field of Classification Search
CPC ............. G06F 16/9035; G06F 16/9038; G06F 16/90335; G06F 16/901; G06F 16/951; G06F 16/248; G06F 17/10; G06F 17/11; G06F 1/03; G06F 7/544; G06Q 10/04
See application file for complete search history.

(56) References Cited

U.S. PATENT DOCUMENTS 6,005,565 A * 12/1999 Legall ................ H04N 5/44543
715/721
7,792,821 B2 * 9/2010 Shakib .................. G06F 16/951
707/714

(Continued)

OTHER PUBLICATIONS

Kay-Uwe Schmidt et al. Socially Filtered Web Search: an Approach Using Social Bookmarking Tags to Personalize Web Search. In Proceedings of the 2009 ACM symposium on Applied Computing (SAC '09). Association for Computing Machinery, 670-674, March (Year: 2009).*

(Continued)

*Primary Examiner* — Greta L Robinson
(74) *Attorney, Agent, or Firm* — Chamberlain, Hrdlicka, White, Williams & Aughtry

(57) ABSTRACT

Embodiments of the present disclosure provide a method, an apparatus and a computer storage media for data searching. For example, there is provided a servicing search requests, the method includes, in response to receiving a search request from a user, acquiring search results matching the search request; determining a matching status between a predefined filter and the search results, the predefined filter being used for filtering search results; and controlling, based on the determined matching status, displaying of the predefined filter to the user.

17 Claims, 7 Drawing Sheets

(56) References Cited

U.S. PATENT DOCUMENTS

| | | | | |
|---|---|---|---|---|
| 9,852,228 B2* | 12/2017 | Martin | ................... | G06Q 30/06 |
| 9,881,066 B1* | 1/2018 | Yousaf | ................. | G06F 16/248 |
| 2002/0087535 A1* | 7/2002 | Kotcheff | ................. | G06F 16/78 |
| 2013/0104063 A1* | 4/2013 | Legris | ................... | G06Q 30/06 |
| | | | | 715/765 |
| 2014/0089290 A1* | 3/2014 | Jackson | ............... | G06F 16/951 |
| | | | | 707/711 |

OTHER PUBLICATIONS

Christopher Peery et al., Multi-Dimensional Search for Personal Information Management Systems. In Proceedings of the 11th International Conference on Extending Database Technology: Advances in Database Technology (EDBT '08). Association for Computing Machiner, 464-475, March (Year: 2008).*

* cited by examiner

METHODS, APPARATUSES, AND COMPUTER STORAGE MEDIA FOR DATA SEARCHING

FIELD

Embodiments of the present disclosure generally relate to the field of data searching, and more specifically, to a method, an apparatus and a computer storage media for data searching in a computer state.

BACKGROUND

With the emergence of a variety of applications, large amounts of data are required to be stored in a storage system. Conventional search functionality to search these large amounts of data is very user-friendly.

SUMMARY

Embodiments of the present disclosure provide methods, apparatuses and computer storage media for data searching.

One of the present disclosure provides a method of data searching. The method comprises: in response to receiving a search request from a user, acquiring search results matching the search request; determining a matching status between a predefined filter and the search results, the predefined filter being used for filtering search results; and controlling, based on the determined matching status, displaying of the predefined filter to the user.

In some embodiments, determining a matching status between a predefined filter and the search results may comprise: determining the number of candidate options hit by the search results in the candidate options of the predefined filter; and wherein controlling the displaying of the predefined filter to the user may comprise: determining, based on the number of the candidate options hit by the search results, a priority of the predefined filter; controlling, based on the priority of the predefined filter, the displaying of the predefined filter to the user.

In some embodiments, determining the number of candidate options hit by the search results in the candidate options of the predefined filter may comprise: bucketing the search results, such that a search result matching a candidate option of the predefined filter is allocated to a bucket associated with the candidate option; determining the number of search results allocated to each bucket; and determining the number of buckets containing at least one search results as the number of candidate options hit by the search results.

In some other embodiments, determining the priority of the predefined filter may comprise: determining the number of candidate options of the predefined filter hit by the search results as a priority value of the predefined filter.

In another embodiment, determining the priority of the predefined filter may comprise: determining the priority of the predefined filter based on the number of candidate options hit by the search results and a historical choice of the user for the candidate options of the predefined filter. In a further embodiment, determining the priority of the predefined filter may comprise determining a priority value of the predefined filter as:

$$F\_Score = \sum_{i=1}^{n} (1 + \delta) g_{(N_i)},$$

where F_Score represents the priority value of the predefined filter, values "1" and "0" of $g_{(N_i)}$ indicate that an i-th candidate option of the predefined filter is hit and missed, respectively, n represents the number of candidate options of the predefined filter and δ represents an adjustment factor determined by the historical choice of the user for candidate options of the predefined filter.

In some embodiments, for $$\delta = \frac{1}{M} \sum_{i=1}^{m} \left(\frac{a}{T(i)}\right),$$

M represents a length of a time window for making statistics of the historical choice of the user, m represents the number of actions of the user for candidate options of the filter within the time window, and "" represents an index of the i-th action within the time window; "a" is a positive constant and T(i) represents a latency from the i-th action within the time window to the time when the priority of the predefined filter is determined. In some embodiments, the actions of the user for candidate options of the filter may comprise displaying or clicking.

In some embodiments, controlling the displaying of the predefined filter to the user may comprise: in response to the priority of the predefined filter being greater than or equal to a first threshold, displaying the predefined filter to the user for further searching of the search result; or in response to the priority of the predefined filter being less than the first threshold, not displaying the predefined filter to the user.

In some other embodiments, controlling the displaying of the predefined filter to the user may comprise: determining, based on the priority of the predefined filter, a display sequence of the predefined filter when being displayed to the user; and displaying the predefined filter to the user in accordance with the determined display sequence.

In some embodiments, determining the matching status between the predefined filter and the search results may comprise: determining the number of search results hitting a candidate option of the predefined filter; and wherein controlling the displaying of the predefined filter to the user may comprise: determining, based on the number of search results hitting the candidate option, a priority of the candidate option; controlling, based on the priority of the candidate option, the displaying of the candidate option of the predefined filter to the user.

In some embodiments, determining the priority of the candidate option may comprise: in response to the number of search results hitting a candidate option being greater than zero and less than a second threshold, determining a priority value of the candidate option as one of: 1, x, and $$a1 \cdot e^{-\left(\frac{x-b1}{c1}\right)^2},$$

where x represents the number of search results hitting the candidate option, $e^{(\cdot)}$ represents an exponent operation, and a1, b1 and c1 are all configurable factors. Alternatively, determining priority of the candidate option may comprise in response to the number of search results hitting the candidate option being equal to zero or being greater than or equal to the second threshold, determining the priority value h of the candidate option as 0.

In some embodiments, determining the priority of the candidate option may further comprise: adjusting, based on historical choice behaviors of the user for the candidate option of the predefined filter, the priority value of the candidate option. In a further embodiment, adjusting the priority value of the candidate option may comprise adjusting the priority value of the candidate option to: $O_{Score}=(1+\delta) \cdot h$, where $O_{score}$ represents an adjusted priority value of the candidate option, h represents a priority value of the candidate option before the adjustment and $\delta$ represents an adjustment factor determined by historical choice behaviors of the user for the candidate option of the predefined filter. In some embodiments, for $$\delta = \frac{1}{M} \sum_{i=1}^{m} \left( \frac{a}{T(i)} \right),$$

M represents a length of a time window for making statistics of the historical choice behaviors, m represents the number of actions of the user for candidate options of the filter within the time window, and "i" represents an index of the actions within the time window; "a" is a positive constant and T(i) represents a latency from an i-th action within the time window to the time when the priority of the predefined filter is determined.

In some embodiments, controlling the displaying of the candidate option to the user may comprise: in response to the priority of the candidate option being greater than or equal to a third threshold, displaying the candidate option to the user for further searching of the search results; or in response to the priority of the candidate option being less than the third threshold, determining to avoid displaying the candidate option to the user. In a further embodiment, displaying of the candidate option to the user may comprise: determining, based on the priority of the candidate option, a display sequence of the candidate option when being displayed to the user; and displaying the candidate option to the user in accordance with the display sequence determined.

In some embodiments, controlling the displaying of the predefined filter to the user may comprise: in response to the number of the search results acquired being greater than a fourth threshold, controlling, based on the determined matching status, the displaying of the predefined filter to the user; or in response to the number of the search results acquired being less than or equal to a fourth threshold, not displaying the predefined filter to the user.

One aspect of the present disclosure provides electronic device. The electronic device comprises at least one processor; and at least one memory. The memory is coupled to the at least one processor and includes computer program codes stored therein. The computer program, when executed by the at least one processor, causes the electronic device to perform any portion of the method(s) of the present disclosure.

One aspect of the present disclosure provides a computer storage medium including computer program codes stored thereon. The computer program codes, when executed in a processor, enable the processor to perform any portion of the method(s) of the present disclosure.

Although particular embodiments have been illustrated via examples in the drawings, it should be understood that descriptions of the detailed embodiments of the text are not intended for limiting the embodiments to the specific forms disclosed here.

BRIEF DESCRIPTION OF THE DRAWINGS

Through the disclosure and claims below, objectives, advantages and other features of the present disclosure will become more apparent. For the purpose of examples, non-restrictive description of the preferred embodiments are provided with reference to the drawings, in which:

DETAILED DESCRIPTION OF EMBODIMENTS

Many details are elaborated in the following description for the purpose of explanation. However, those ordinary skilled in the art will recognize that embodiments of the present disclosure can be implemented without utilizing the specific details. Therefore, the present disclosure is not restricted to the illustrated embodiments. Instead, the present disclosure is given a broadest scope in consistency with principles and features described herein.

It should be understood that the terms "first," "second" and the like are used for distinguishing one element from a further element only. However, the first element, in fact, can also be known as second element and vice versa. Moreover, it should also be understood that "include" and "comprise" are only for explaining presence of stated features, elements, functions or components without excluding the presence of one or more other features, elements, functions or components.

Figure 1:
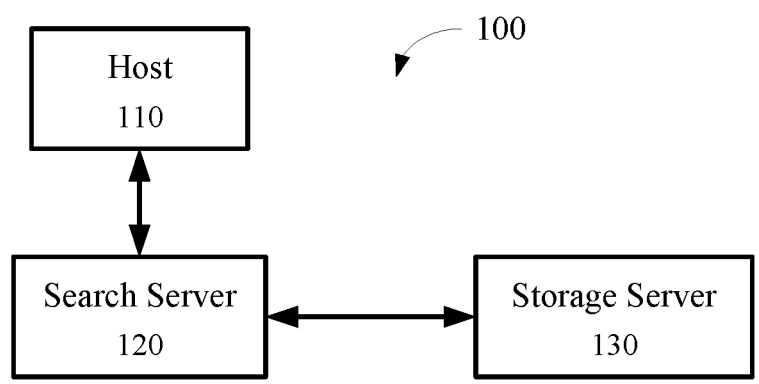
FIG. 1 illustrates a schematic structure diagram of an example computer system in which embodiments of the present disclosure can be implemented.

FIG. 1 illustrates a schematic diagram of an example computer system 100 in which embodiments of the present disclosure can be implemented. However, it should be noted that a particular architecture of the computer system shown in FIG. 1 is not required in some embodiments.

The example computer system 100 in FIG. 1 includes therein a user host 110, a search server 120 and a storage server 130. The search server 120 can receive a query/search request, which is sent by the user host 110 from the user, search data in the storage server 130, and return search results to the user.

The user usually starts the query/search by providing some keywords, and the user can optionally narrow down a search scope using a search filter. However, in a current method of searching, the search scope is usually limited by using a plurality of preset static search filters.

Table 1 shows an example of a data set from which data can be searched. In the example data sets of Table 1, each column has been indexed, for example, the first column is identity (ID), the second column is file name, the third column is city and the fourth column is operating system (OS) etc. The last column is contents in a record (dummy text). It is assumed that the ID of each record in Table 1 is unique and the index (ID, file name, city etc.) of each column, apart from the last column, can serve as a filter in the search to constrain/filter the search results. Further, Table 1 supports a full-text search, such as searching the dummy text column with keywords. In order to simplify, the example data sets in Table 1 only contains 16 records. However, it should be noted that a larger data sets might be involved in an actual search.

TABLE 1

Example of Data Sets

| Identity | File Name | City (where backup comes from) | Operating System | Size (M) | File Type | Origin Node | Dummy Text |
|---|---|---|---|---|---|---|---|
| 1 | System-file-1 | Shanghai | Win | 18 | exe | Fudan University | A student (IT) is a learner or someone who attends an educational institution. In the United Kingdom, those attending university are termed "students" while "pupil" refers to an attendee of a lower educational institute |
| 2 | System-file-2 | Beijing | Linux | 34 | word | Peking University | IT Engineers, as practitioners of engineering, are people who invent, design, analyse, build and test machines, systems, structures and materials to fulfill objectives and requirements while considering the limitations imposed by practicality, regulation, safety, and cost |
| 3 | System-file-3 | Shanghai | Win | 67 | pdf | Tongji University | who holds an advanced degree and is licensed to practice. See your doctor if the condition worsens. |
| 4 | System-file-4 | Guangzhou | Win | 13 | exe | Guangzhou University | Current Semester Information • My Class Tools • Classroom Testing Center • Transfer Information • Academic Information |
| 5 | System-file-5 | Beijing | Linux | 45 | word | Peking University | ohn Smeaton was the first self-proclaimed civil engineer and is often regarded as the "father" of civilengineering |
| 6 | System-file-6 | Hangzhou | M | 46 | word | China Academy of Arts | Do you want to be an engineer? Learn about the branches of engineering. Get IT information about earnings, educational requirements, and job outlook. |
| 7 | System-file-7 | Hangzhou | Win | 63 | pdf | China Academy of Arts | Health-care consumers considering a physician at U of U Health are able to make informed choices thanks to this online tool |
| 8 | System-file-8 | Beijing | Linux | 23 | word | Peking University | Engineering information and connections for the global community of engineers. Find engineeringgames, videos, jobs, disciplines, calculators and articles |
| 9 | System-file-9 | Shanghai | Win | 26 | txt | Fudan University | The world's first and largest educational marketplace with more than two million original teacher-created resources available for use today. |

TABLE 1-continued

Example of Data Sets

| Identity | File Name | City (where backup comes from) | Operating System | Size (M) | File Type | Origin Node | Dummy Text |
|---|---|---|---|---|---|---|---|
| 10 | System-file-10 | Guangzhou | Linux | 41 | word | Guangzhou University | The term is probably a shortening of "software engineer," but its use betrays a secret: "Engineer" is an aspirational title in software development |
| 11 | System-file-11 | Hainan | Linux | 53 | txt | Hainan University | A teacher is a person who helps others to acquire knowledge, competences or values. Informally the role of teacher may be taken on by anyone (e.g. when showing a colleague how to perform a specific task). In some countries, teaching young people of school age may be carried out in an informal setting, such as within IT |
| 12 | System-file-12 | Shanghai | Win | 23 | word | Tongji University | Since the early days of Google, people throughout the company have questioned the value of managers. That skepticism stems from a highly technocratic culture. As one software engineer, Eric Flatt, puts it, "We are a company built by engineers for engineers." And most engineers, not just those at Google, want to spend |
| 13 | System-file-13 | Beijing | Linux | 45 | Pdf | Peking University | Search or browse RateMDs for trusted reviews & ratings on doctors in Salt Lake City. We're the originaldoctor ratings site with over 2 million reviews. |
| 14 | System-file-14 | Hangzhou | Win | 18 | exe | China Academy of Arts | 6 days ago - Define student: scholar, learner; especially: one who attends a school—IT student in a sentence |
| 15 | System-file-15 | Shanghai | Linux | 23 | word | Fudan University | Scientists are developing ways to edit the DNA of tomorrow's children. Should they stop before it's too late? |
| 16 | System-file-16 | Beijing | Linux | 45 | pdf | Peking University | A physician, medical practitioner, medical doctor, or simply doctor is a professional who practises medicine, which is concerned with promoting, maintaining, or restoring health through the study, diagnosis, and treatment of disease, injury, and other physical and mental impairments. |

Figure 2:
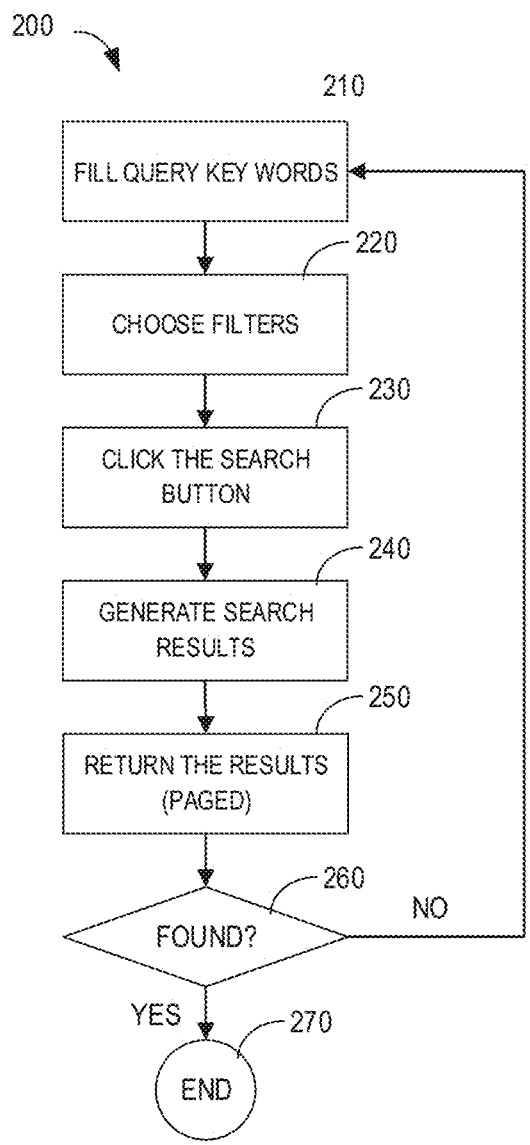
FIG. 2 illustrates a flow of data searching in a conventional solution.

FIG. 2 illustrates an example flowchart of a traditional searching method. In this flow, it is assumed that a user will search data from the data sets shown in Table 1. As shown in FIG. 2, at block 210, the user inputs query keywords in a search box. For example, if the user wants to find a file related to information technology (IT) industry, and then he may input "IT" as the keyword, such that a search engine can conduct a query with full-text using "IT".

Figures 3, 4:
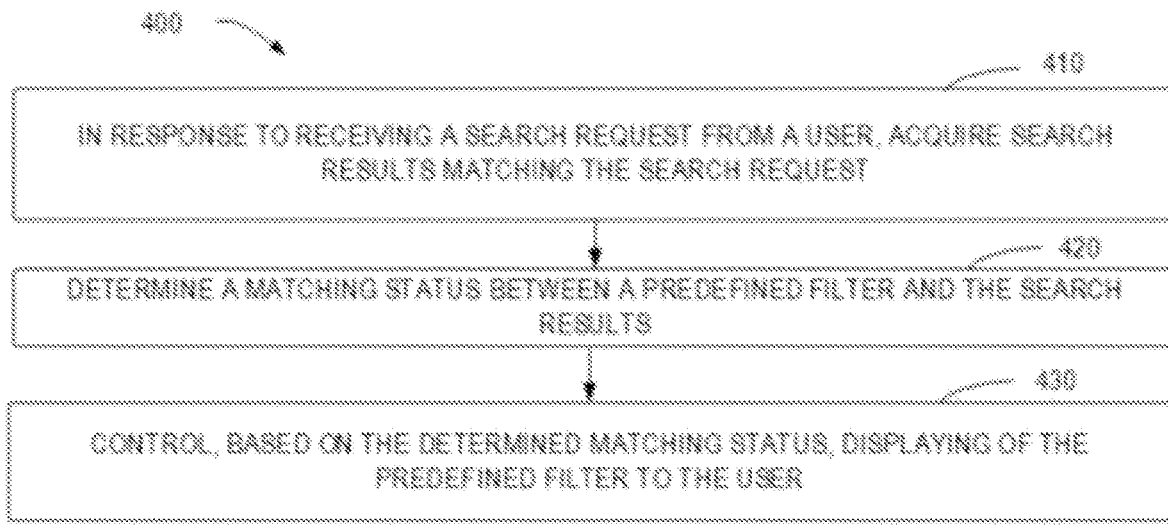
FIG. 3 illustrates an example of a static filter.
FIG. 4 illustrates a flowchart of a method of data searching according to embodiments of the present disclosure.

At block 220, the user can select a filter to narrow down the search scope. FIG. 3 illustrates an example of a user interface of a traditional filter. Accordingly, the traditional filter set is predefined, that is, there are a fixed number of filters in the set and each filter includes all possible filter options. Therefore, the user needs to decide which filter options to use prior to the query.

In the example of FIG. 2, assuming the user remembered that he is looking for a file of "exe" type but forgets the city from which the file is backed up. Thus, the user can select, at block 220, the file type="exe" and the city="all" as filters from the predefined static filter sets.

At block 230, the user, for example, starts the query by clicking a search button.

At block 240, based on filters and query words, all matched records are found at a backend (e.g., in the search server) to generate a query result. For example, a set of recorded ID matching the query keyword IT is A (ID)={1, 2, 6, 11, 14, 15}; meanwhile, the record set matching the filter "city=all" is B (ID)={1,2,3,4,5,6,7,8,9,10,11,12,13,14,15, 16}; the record set matching the filter "file type=exe" is C (ID)={1, 4, 14}. Then, the final search result set R=A∩B∩C={1, 14}. That is, the first record and the fourteenth record are the final search results. It should be noted that although, in the example, it is assumed that two matched records are found from the data sets of Table 1, there may be more hit records in actual searches, such as billions of records.

At block 250, the search server returns the query result to the user. The query result, dependent on its number, can be displayed in a single page or in a paged manner.

At block 260, if the user determines that the needed record is found, the flow ends at block 270; otherwise, if the user find there are too many records to read (which is often the case) and wants to narrow down the scope of the search result, the flow returns to block 210 or 220 in order to refine the query keyword and/or change the filters for further search.

For example, when the search is performed again, the user can modify the value of the city filter to acquire a set with fewer results. Assuming the user sets the filter "city=Shanghai", the record set matching the query keyword IT is A (ID)={1, 2, 6, 11, 14, 15} in the search performed again; meanwhile, the record set matching the filter "city=Shanghai" is B (ID)={1, 3, 9, 12, 15} and the record set matching the filter "file type=exe" is C (ID)={1, 4, 14}. Then, the final result set R=A∩B∩C={1} and one query record is acquired.

It should be noted that, in the actual search, the returned search results may specify a significant number of records, so it might be required that the cycle is repeated again and again to adjust the filter and search until the returned search result set is small enough for the user.

A user-friendly search function user interface will assist users to complete the searching efficiently. With reference to the example described in FIG. 2, in order to rapidly narrow down the search result, currently, some predefined static filters (e.g., shown by FIG. 3) have been provided to assist the user to narrow down the search scope. For example, if the user wants to find a file named "system-file-1" and knows that the file is backed up from Shanghai, then the user can assign one filter as "city=Shanghai" to limit the search scope to acquire better search performance.

However, predefining the static search filters for users is not an efficient approach to enable a user to query large data sets. Specifically, backup data becomes large and has varied content, which makes it difficult to specify the appropriate set of predefine the filters (for both keywords and values). Further, the full-text search has become more common and users have no idea on how to select a reasonable filter at the beginning in most cases. Meanwhile, improving user experience has become more important at the present. However, the predefined filters cannot provide a satisfactory user experience.

In addition, there may be other potential drawbacks for using pre-defined filters For example, the predefined filter is static, so it cannot change in accordance with user's behavior. In other words, if 7 predefined filers, for example, including ID, file name, city, operating system, file size, file type and node position, are displayed to the user, then these 7 filters are always displayed at each query. Further, each pre-defined filter always contains all possible values (candidate options), this is not optimal for an improved user experience.

For example, the user may have no idea on how to select a correct filter at the first query. Most of the time, the user may just input some keywords for query within an entire scope. Further, some filters might have so many options that it is difficult for the user to select the appropriate options. For example, the filter of city may have thousands of values (candidate options). Although cities can be further classified into respective provinces, the number of the candidate options is still very large.

Moreover, some filters may contribute little to narrow down the search result since their candidate options (possible values) are not evenly distributed. For example, if all search results match "city=Beijing", using "city=Beijing" as a filter does not help narrowing down the search scope in this case. In addition, some filters (such as city and school) may be implicitly related. For example, once a city is assigned, all possible schools will be delimited.

Furthermore, the currently predefined filters and their options do not vary along with the change of the keywords or the search results.

In view of the aforementioned limitations of current search filters and other limitations of current search filters, the present disclosure proposes a new method, an apparatus and a computer readable storage medium for data searching. For example, a new method for creating a filter, guiding users to narrow down the search result and assisting them to find the file to recover the system is provided according to some embodiments.

In some embodiments of the present disclosure, there is provided a method for dynamically controlling the filters and/or filter options presented to users for further search based on the analysis of the search result.

In some embodiments, the search results are grouped (e.g., bucketing) and the score for each filter (and its options) is calculated; and it is determined whether the filter or the option is to be displayed to the user based on the score; and/or the sequence of the filter or the option during displaying is determined. For example, in some embodiments, the filter and/or its options can be intelligently displayed based on the analysis to the research result, where "intelligent" can be demonstrated as hiding useless filters (and/or options) which might make little contribution on narrowing down the search results, and/or sorting the filters (and/or options) by priority.

In some further embodiments, it is also proposed to record and analyze historical searching behaviors of users with artificial intelligence (AI) technology and regard the behaviors as one feature of machine learning (ML) to improve a model used for calculating scores.

Some embodiments of the present disclosure will be described below with reference to drawings to help understand the solution proposed by the present disclosure.

FIG. 4 illustrates a method 400 of data searching according to embodiments of the present disclosure. The method can be implemented by a search engine or a search server, such as the search server 120 in FIG. 1. For the sake of description, embodiments of the method 400 are described with reference to the search server 120 and the computer system 100 in FIG. 1. However, it should be understood that the method 400 is not limited to be implemented in the particular example structure.

As shown in FIG. 4, at block 410, in response to receiving a search request from a user, the search server 120 acquires search results matching the search request. The search results can, for example, come from the user host 110 in FIG. 1. The search request can include, for example, keywords used for searching, or both keywords and filters. The filters can be one or more of the predefined filter set, where each predefined filter is used for filtering/constraining the search result. However, it should be noted that the search request does not necessarily include a filter.

Because the search request does not have to include a filter, in some embodiments, the search server can execute the search based on the keywords within the entire search scope. As the search server can operate fast enough, it is unnecessary to worry the search performance. As an example, the search server 120 can acquire, based on the keyword "IT" in the user's request, the search result A (ID)={1, 2, 6, 11, 14, 15} from the data set of Table 1.

It should be understood that there may be many search results acquired at block 410 in the actual search. Therefore, the search server 120 analyzes, at block 420, the search result to determine the matching status between the predefined filters and the search result, and controls, at block 430, displaying of the predefined filters to the user based on the determined matching status.

By analyzing the search result, the filters and/or other candidate options which are beneficial to further narrowing down the search scope can be determined in the operations at blocks 420 and 430, and favorable filters and/or other candidate options can be displayed to the user, thereby simplifying user's operations, and improving user experience.

As an example instead of a limitation, in some embodiments, the search server 120 can determine, at block 420, the number of candidate options hit by the acquired search results in the candidate options of the predefined filters. The predefined filters can come from a predefined filter set. For example, for the data set of Table 1, the predefined filter set can include ID, file name, city, operating system, size, file type and node position. The operation at block 430 will be explained by taking the predefined filter "city" as an example.

In one example, "city" filter has five candidate options which are Shanghai, Beijing, Guangzhou, Hangzhou and Hainan. Therefore, the search server can determine, at block 420, the number of candidate options hit by the search results A (ID) in this five candidate options. As an example instead of a limitation, the search server 120 can determine, at block 420, the number of candidate options hit by the search results A (ID) based on the operation 500 of FIG. 5.

Figure 5:
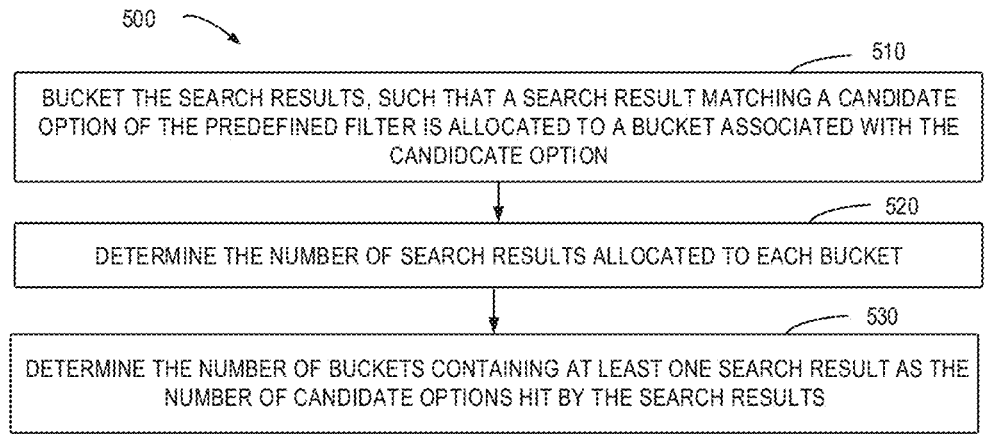
FIG. 5 illustrates an example operation of determining the number of filter options hit by a search result according to embodiments of the present disclosure.

In the example of FIG. 5, the search server 120 buckets the search result, such that the search result matching the candidate options (such as Shanghai, Beijing, Guangzhou, Hangzhou and Hainan) of the predefined filter (e.g., "city") is divided into a bucket associated with each candidate option. In other words, each bucket represents an option of the filter (or value of the filter) and a group of buckets denote the filter.

Figure 6:
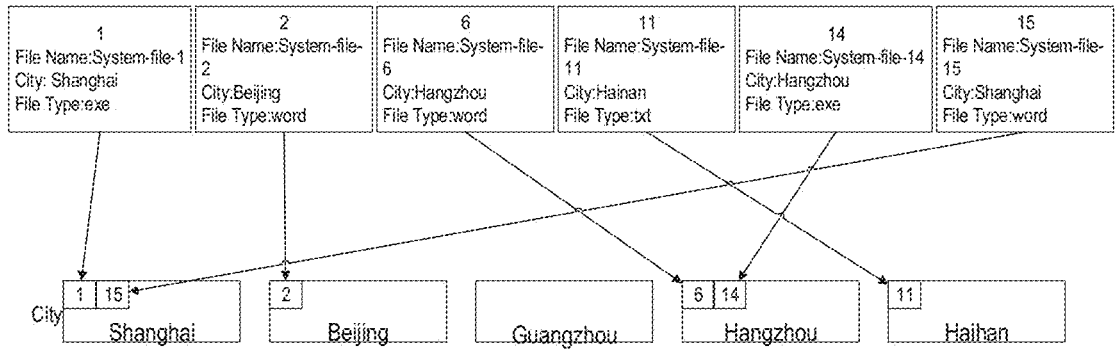
FIGS. 6-7 illustrate an example operation of bucketing search results according to embodiments of the present disclosure.

Taking the filter "city" as an example, the search server 120 can place, in accordance with the attribute of each record in the search results, the records of the search result A (ID)={1, 2, 6, 11, 14, 15} respectively into the buckets associated with Shanghai, Beijing, Guangzhou, Hangzhou and Hainan. The bucketing result is shown in FIG. 6, where each bucket may contain a different number of search results. For example, the search results with ID being 1 and 15 are allocated to the bucket associated with "Shanghai" while the search results with ID being 2 are allocated to the bucket associated with "Beijing."

At block 520, the search server 120 determines the number of search results allocated to each bucket. It should be noted that because the search result A is one subset obtained after the entire data set in Table 1 has been filtered by the keyword (or filter options), some buckets may be empty, which means the buckets are not hit by the search results. In this example, the bucket associated with the candidate option "Guangzhou" is empty while the other 4 buckets contain at least one search result.

At block 530, the search server 120 determines the number of buckets containing at least one search result as the number of candidate options hit by the search results. In this example, the number of candidate options hit by the search results for the filter "city" is determined as 4.

Figure 7:
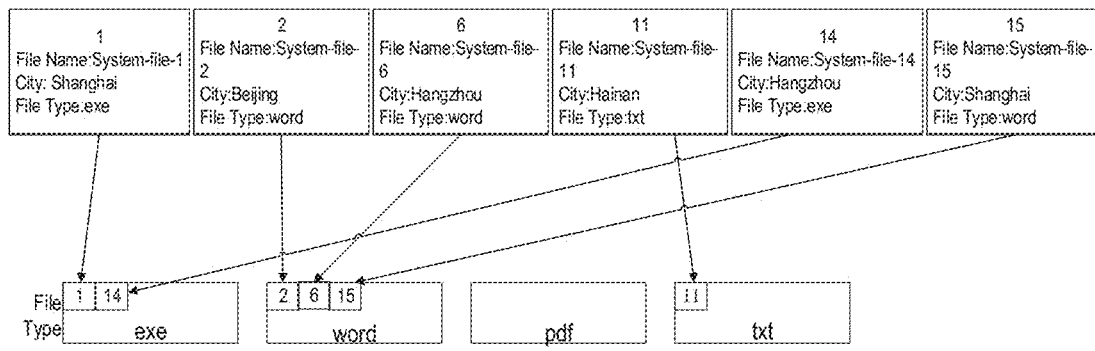

FIG. 7 also illustrates a grouping operation by taking the filter "file type" as an example. In this example, the search result A (AD) is allocated to the buckets, respectively associated with candidate options "exe," "word," "pdf" and "txt." Besides, when the bucketing is executed via the operation of FIG. 5, the bucket corresponding to "pdf" is empty while the other 3 buckets contain at least one search result. Therefore, in the example, the search server 120 can determine, at block 530, the number of candidate options hit by the search results for the filter "file type" as 3.

Now return to FIG. 4. In some embodiments, the search server 120 can control, based on the matching statistics determined by the operation of FIG. 5, at block 430, the displaying of the predefined filters to the user in various manners. As an example, FIG. 8 illustrates an operation 800 which can be implemented in the block 430.

Figure 8:
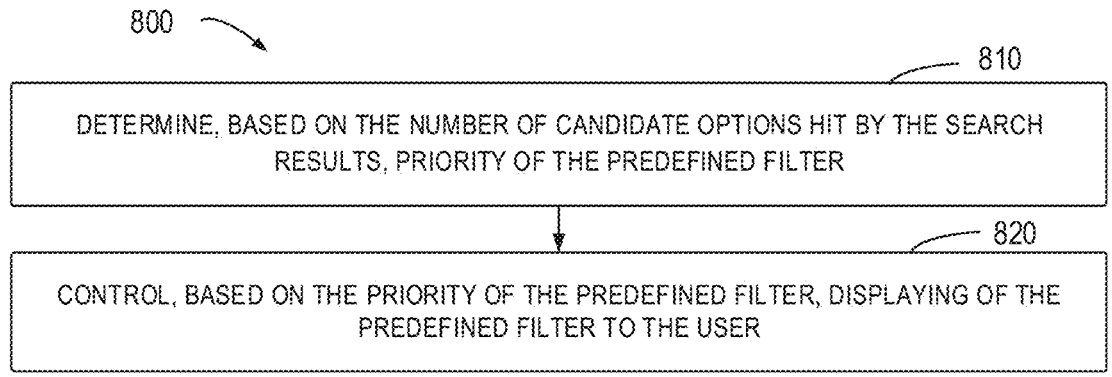
FIG. 8 illustrates an example operation of controlling displaying of filters to a user according to embodiments of the present disclosure.

In the example of FIG. 8, the search server 120 can determine a priority of the predefined filters based on the number of candidate options of the predefined filters hit by the search results at block 810. The priority can be determined by various methods. As an example instead of a limitation, the search server 120 can determine the number of candidate options of the predefined filter hit by the search results determined in block 420 as the priority value of the predefined filter. In this example, the priority value of the predefined filter can be determined as:

$$F\_Score = \sum_{i=1}^{n} g_{(N_i)} \qquad (1)$$

F_Score represents a priority value of the predefined filter, n indicates the number of candidate options of the predefined filter, the values "1" and "0" of g($N_i$) indicate that the i-th candidate option of the predefined filter is hit and missed, respectively, that is, $$g(x) = \begin{cases} 1 & (x > 0) \\ 0 & (x \leq 0) \end{cases} \quad (2)$$

x represents the number of search results hitting the candidate option. Therefore, the priority of the "city" can be determined as 4 in the above example because $$\begin{aligned} F\_Score(city) &= \sum_{i=1}^{s} g_{(N_i)} \\ &= g(N_1) + g(N_2) + g(N_3) + g(N_4) + g(N_5) \\ &= g(2) + g(1) + g(0) + g(2) + g(1) \\ &= 4 \end{aligned} \quad (3)$$

Likewise, the priority of "file type" filter can be determined as 3.

Optionally, in some embodiments, the artificial intelligence (AI) technology can be adopted when the priority of the filter is determined. The historical choices (such as displaying and clicking) of the users for the filter are taken in to consideration, thus the priority value of the filter is adjusted based on the historical behaviors.

In some embodiments, the historical behaviors of users can be acquired by logs. For example, clicks of a user for each filter option and/or the statistic of the number of displaying for each option can be recorded by the logs. That is, if one candidate option of the filter is displayed to the user, it is recorded in the log once as the statistic of the number of displaying of the candidate option. Likewise, if the user clicks a certain candidate option (for use in query), it is recorded in the log once as the statistic of the number of clicking of the user.

As an example instead of a limitation, the log can have the following attributes: (timestamp, keyword, type, object, 1), where the type field can indicate the type (such as displaying/clicking) of behavior targeted by the statistic; the object field indicates the ID of the candidate option targeted by the log. The timestamp field can denote the time recorded by the log, that is, the time when the user behavior occurs. For example, log (1521707530, "IT," display, city: Shanghai, 1) can represent at 03/22/2018 @ 8:32 am (UTC), the candidate option "Shanghai" of the filter "city" is displayed to the user once when the user queries the keyword "IT." Similarly, (1521707530, "IT," click, city: Shanghai, 1) can represent that at 03/22/2018 @ 8:32 am (UTC), the candidate option "Shanghai" of the filter "city" is clicked by the user (for reducing the search results) when the user queries the keyword "IT."

As an example, at block 810, the search server 120 can determine, based on the historical behaviors of the user, the priority value of the predefined filter as:

$$F\_Score = \sum_{i=1}^{n} (1 + \delta) g_{(N_i)} \quad (4)$$

Where F_Score represents the priority value of the predefined filter, the values "1" and "0" of g($N_i$) indicate that the i-th candidate option of the predefined filter is hit and miss, respectively, n represents the number of candidate options of the predefined filter and δ represents an adjustment factor determined by the above historical behaviors of the user for the candidate options of the predefined filter.

Embodiments of the present disclosure are not limited to any particular adjustment factor. Just as an example, δ can be determined as:

$$\delta = \frac{1}{M} \sum_{i=1}^{m} \left( \frac{a}{T(i)} \right) \quad (5)$$

M represents a length of a time window for making statistics of the historical behaviors of users, m represents the number of actions of the user for the candidate options of the filter within the time window, and i represents an index of the i-th action within the time window. As an example instead of a limitation, the actions of the user for the candidate options of the filter can include displaying or clicking. Besides, a is a positive constant, for example (but not limited to), 1 in the above equation (5), while T(i) represents a latency from the i-th action of the user for the candidate options of the filter within the time window to the time when the priority of the predefined filter is determined. T(i) can be denoted as T(i)=t1−t2(i), where t1 represents the time when the priority of the predefined filter is determined whereas t2(i) represents the time of the i-th action of the user for the candidate options of the filter, the time being acquired, for example, from the timestamp in the log.

It is assumed in a time window of the past month, all candidate options of the "city" filter are clicked 100 times while the candidate option "Shanghai" is clicked 10 times. Table 2 shows latency of the 10-time clicking on "Shanghai."

TABLE 2

Statistics about occurrence time of clicking on candidate option "Shanghai"

| T(i) (Day) | 1/T(i) |
|---|---|
| 1 | 1 |
| 1 | 1 |
| 2 | 0.5 |
| 3 | 0.333333333 |
| 4 | 0.25 |
| 4 | 0.25 |
| 6 | 0.166666667 |
| 8 | 0.125 |
| 8 | 0.125 |
| 10 | 0.1 |
| Total | 3.85 |

If it is set that a=1, the value of δ can be determined using the equation (5) as:

$$\delta(city:Shanghai) = \frac{1}{100} \sum_{i=1}^{n} \left( \frac{1}{T(i)} \right) = 1/100 * (1 + 1 + 0.5 + 0.33333...) \quad (6)$$

$$= 0.0385$$

After the priority of the filter is determined, for example, based on the equation (1) or (4), at block 820, the search server 120 can control, based on the priority of the predefined filter, the displaying of the predefined filter to the user. For example, some predefined filters of low priorities can be hidden and not displayed to the user because they may make no contributions to reducing the number of search results.

Specifically, in some embodiments, at block 820, if the priority of the predefined filter is greater than or equal to a first threshold, the search server 120 can display the predefined filter to the user for further searching of the search results; otherwise, the search server 120 can determine to avoid displaying the predefined filter to the user.

Alternatively or additionally, in some embodiments, at block 820, the search server 120 can determine, based on the priority of the predefined filter, a display sequence of the predefined filters when being displayed to the user, and display the predefined filters to the user according to the determined display sequence. For example, if the priority of "city" filter is determined as 4 and the priority of "file type" is determined as 3, "city" filter can be displayed before the "file type" filter.

Now refer to FIG. 4 again. In some embodiments, alternatively or additionally, the search server 120 can determine, at block 420 of FIG. 2, the matching status between each candidate option of the predefined filter and the search results. By taking FIG. 6 as an example, at block 420, the search server 120 can determine, by the bucketing operation, the numbers of search results hitting candidate options of the filter "city", that is, Shanghai, Beijing, Guangzhou, Hangzhou, and Hainan, are 2, 1, 0, 2 and 1, respectively. Similarly, in the example of FIG. 7, the search server 120 can determine, at block 420, by the bucketing operation, the numbers of search results hitting the candidate options, namely, "exe," "word," "pdf" and "txt" of the filter "file type", are 2, 3, 0 and 1, respectively.

Correspondingly, the search server 120 can control, at block 430, the displaying of the candidate option of the predefined filter to the user. For the purpose of illustration rather than limitation, FIG. 9 illustrates an operation 900 which can be implemented at block 430.

Figure 9:
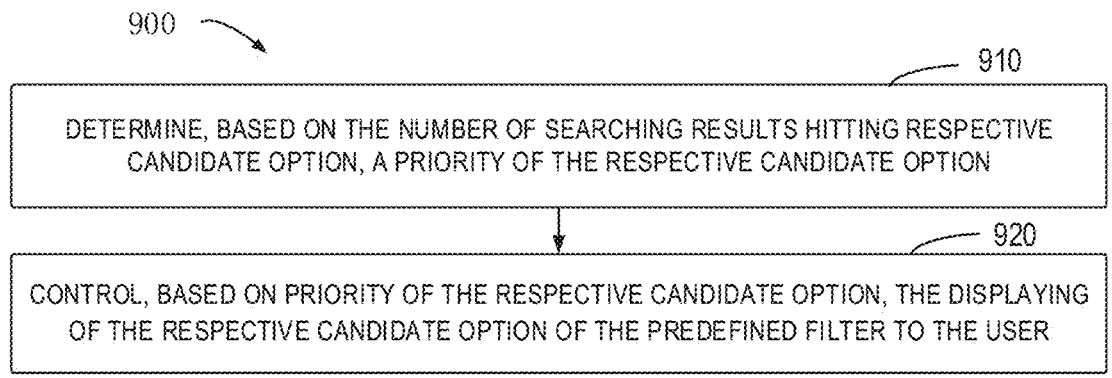
FIG. 9 illustrates an example operation of controlling displaying of candidate options of filter to a user according to embodiments of the present disclosure.

As shown in FIG. 9, at block 910, the search server 120 may determine, based on the number of search results hitting a candidate option, the priority of the candidate option. The way of determining the priority of the candidate option is not limited in any particular manner in the embodiments of the present disclosure. Just as an example, the priority can be determined based on a comparison between the number of search results hitting the candidate option and a threshold.

For example, the priority of the candidate options of a given filter can be determined as:

$$h(x) = \begin{cases} 1 & (x > 0 \text{ and } x < \text{Max}) \\ 0 & (x \leq 0 \text{ or } x \geq \text{Max}) \end{cases} \quad (7)$$

x represents the number of search results hitting the candidate option and h represents the priority of the candidate option. Max represents a hit number threshold used for determining the priority. The threshold, for example, can be set to 100000. It should be noted that the threshold can be specifically configured in accordance with different scenarios and should not be limited to any particular value.

In the example of FIG. 6, the priority of the candidate option "Shanghai" of "city" filter can be determined as 1 by the above equation (7) and the priority value of candidate option "Guangzhou" is 0.

Figure 10:
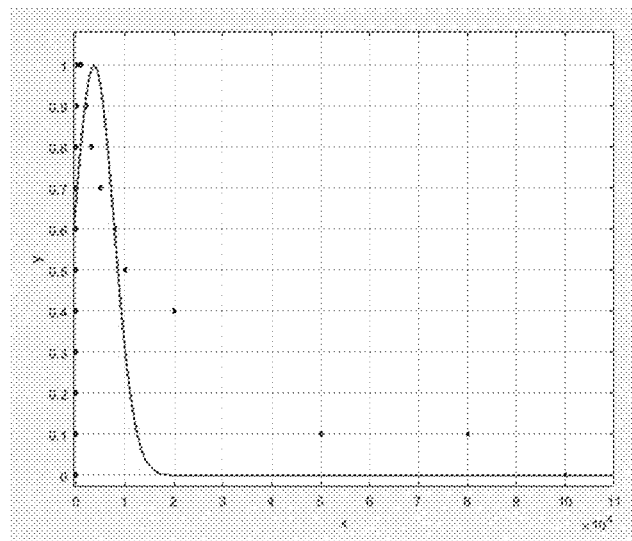
FIG. 10 illustrates an example model of adjustment factors for adjusting priority of the filter according to embodiments of the present disclosure.

It should be understood that the priority of the candidate option also can be determined using other algorithms. For example, the priority of the candidate option of the filter can be alternatively determined by (8) or (9).

$$h(x) = \begin{cases} x & (x > 0 \text{ and } x < \text{Max}) \\ 0 & (x \leq 0 \text{ or } x \geq \text{Max}) \end{cases} \quad (8)$$

$$h(x) = \begin{cases} a1 \cdot e^{-\left(\frac{x-b1}{c1}\right)^2} & (x > 0 \text{ and } x < \text{Max}) \\ 0 & (x \leq 0 \text{ or } x \geq \text{Max}) \end{cases} \quad (9)$$

x represents the number of search results hitting the candidate option, $e^{(\cdot)}$ represents an exponent operation, and a1, b1 and c1 are all configurable factors; where equation (8) is a linear function, which means that the more the search results hitting the candidate option, the higher the priority of the candidate option is. Equation (9) is a general Gaussian model. By using the equation (9), if the number of search results hitting the candidate option falls within a central region of X-axis, it means that the priority of the candidate option is high; instead, if the number of search results hitting the candidate option falls at both ends of the X-axis, it indicates the priority of the candidate option is low. The range and the center point of the Gaussian model can be tuned via the factors a1, b1 and c1. For example, if it is set that a1=0.9984, b1=3658 and c1=5821, the Gaussian model of the equation (9) is of the form as shown by FIG. 10. Different algorithms have different characteristics, so a suitable algorithm can be selected in accordance with specific requirements of the application to determine the priority of the candidate option in a specific implementation.

Besides, in some embodiments, the search server 120 can adjust, based on the historical choice behaviors of the user for the candidate options of the predefined filter, the priority values of the candidate options at block 910. As an example instead of a limitation, h represents the priority value of the candidate option before an adjustment, so the adjusted priority value of the candidate option can be represented as:

$$O_{Score} = (1+\delta) \cdot h \quad (10)$$

δ represents an adjustment factor determined by the historical choice behaviors of the user for the candidate option of the predefined filter. In some embodiments, δ can be determined for example by the equation (5).

After determining the priority of the candidate option, the search server 120 can control, based on the priority of the candidate option, the displaying of the candidate option of the predefined filter to the user at block 920.

For example, if the priority of the candidate option is greater than or equal to a predetermined threshold, the search server 120 can display the candidate option to the user for further searching of the search results; otherwise, if the priority value of the candidate option is less than the predetermined threshold, the search server 120 can determine to avoid displaying the candidate option to the user.

Alternatively or additionally, in some embodiments, at block 920, the search server 120 can determine, based on the priority of the candidate option, a display sequence of the candidate option when being displayed to the user, and display the candidate option to the user in accordance with the determined display sequence. For example, the search server 120 can display the candidate option with high priority closer to front.

As described above with reference to several examples, the search server 120 can, for example at the block 430 of FIG. 4, control at least one of: whether to display the predefined filter, a display sequence of the predefined filter, whether to display the candidate option of the predefined filter and the display sequence of the candidate option of the predefined filter. Due to the display control of the filters and/or their candidate options, only the filters and/or candidate options which are beneficial to narrowing down the search scope and reducing the search results are provided to the users, so as to change the traditional predefined filters into filters which are dynamic and adaptive to the search results, thus making the data search of the user more efficient and improving user experience.

Moreover, it should be noted that the displaying control in block 430 can be enabled only when a particular condition is satisfied. For example, if the number of search results acquired in the block 410 is greater than a given threshold, the search server 120 can determine that there are too many search results and accordingly control, based on the matching status between the predefined filter and the search results, the displaying of the predefined filter (including the filter per se and/or its candidate options) to the user; if the number of search results acquired in the block 410 is less or equal to the predetermined threshold, the search server 120 can determine to avoid displaying the predefined filter to the user.

Figure 11:
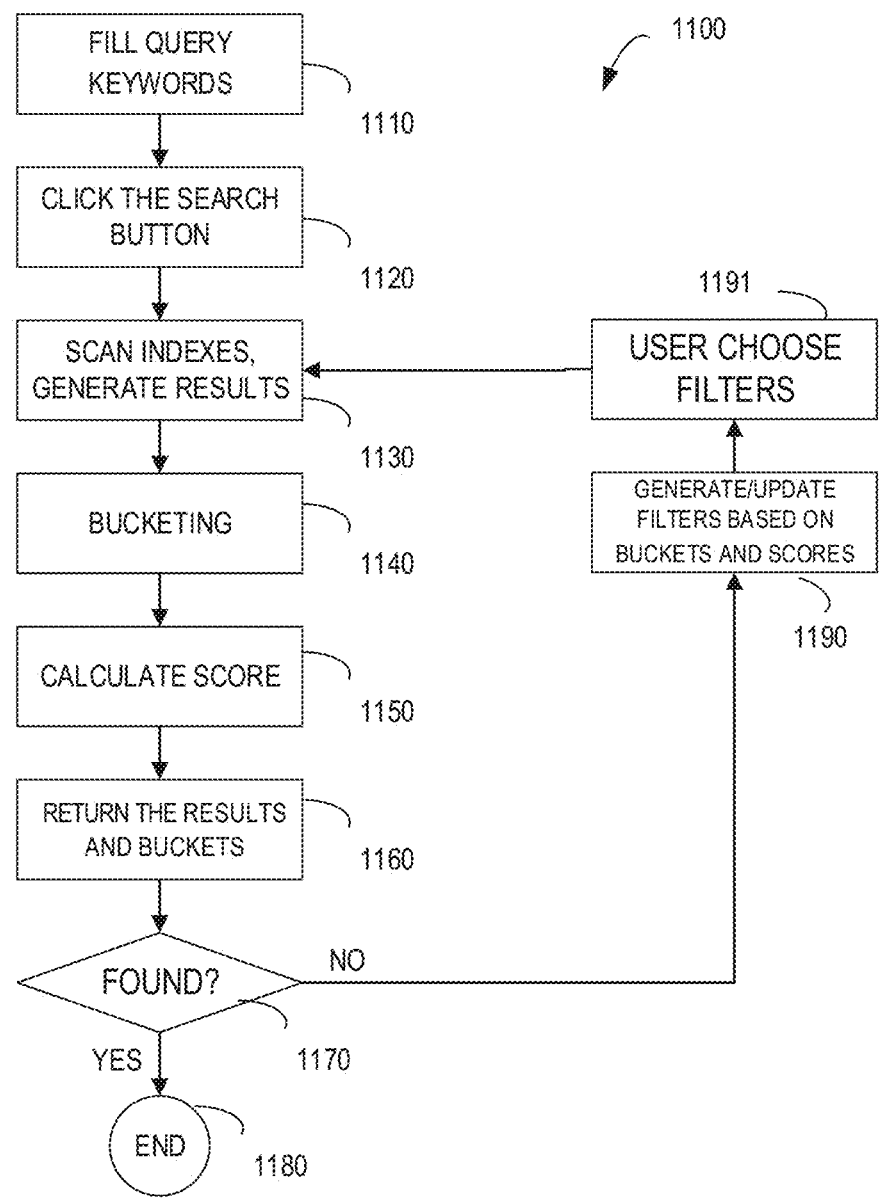
FIG. 11 illustrates a flow of a further method of data searching according to embodiments of the present disclosure.

FIG. 11 illustrates a flow of another method 110 of data searching according to some embodiments of the present disclosure. In the method, a user inputs, at block 1110, the query keyword (such as "IT"). It should be noted that the user does not have to choose a filter, such that the search server searches within the entire search scope based on the keyword alone. However, in some embodiments, the user also can select one or more filters in the predefined filter set at block 1110. An example of a computer program code for implementing the search request is shown below:

```
GET /*~001/_search
{"query": {"match": {"dummytext":"IT"}},
"aggs":{
"city":{"terms":{"field" : "city"}},
"occupation":{"terms":{"field" : "occupation"}}
}
}
```

At block 1120, the user clicks the search button to send the search request.

At block 1130, the search server scans the data set to generate search results.

At block 1140, in order to generate a more reasonable filter later, the search server buckets the set search results. The bucketing operation can be performed using the operation described above with reference to method 400. In some embodiments, the search server can implement the bucketing operation by, for example but not limited to, applying ElasticSearch V5.0. For example, bucketing can be performed via the following computer program code:

```
{
"took": 26,
"timed_out": false,
```

-continued

```
"_shards": {
    "total": 428,
    "successful": 428,
    "failed": 0
},
"hits": {
    "total": 201998,
    "max_score": 8.589889,
    "hits": [
        . . . results here . . .
    ]
},
"aggregations": {
    "city": {
        "doc_count_error_upper_bound": 0,
        "sum_other_doc_count": 0,
        "buckets": [
            {
                "key": "shanghai",
                "doc_count": 124843
            },
            {
                "key": "beijing",
                "doc_count": 77155
            }
        ]
    },
    "occupation": {
        "doc_count_error_upper_bound": 148,
        "sum_other_doc_count": 15378,
        "buckets": [
            {
                "key": "student",
                "doc_count": 73511
            },
            {
                "key": "doctor",
                "doc_count": 55150
            },
            {
                "key": "engineer",
                "doc_count": 22577
            }
            ...
        ]
    }
}
}
```

Figures 12, 13:
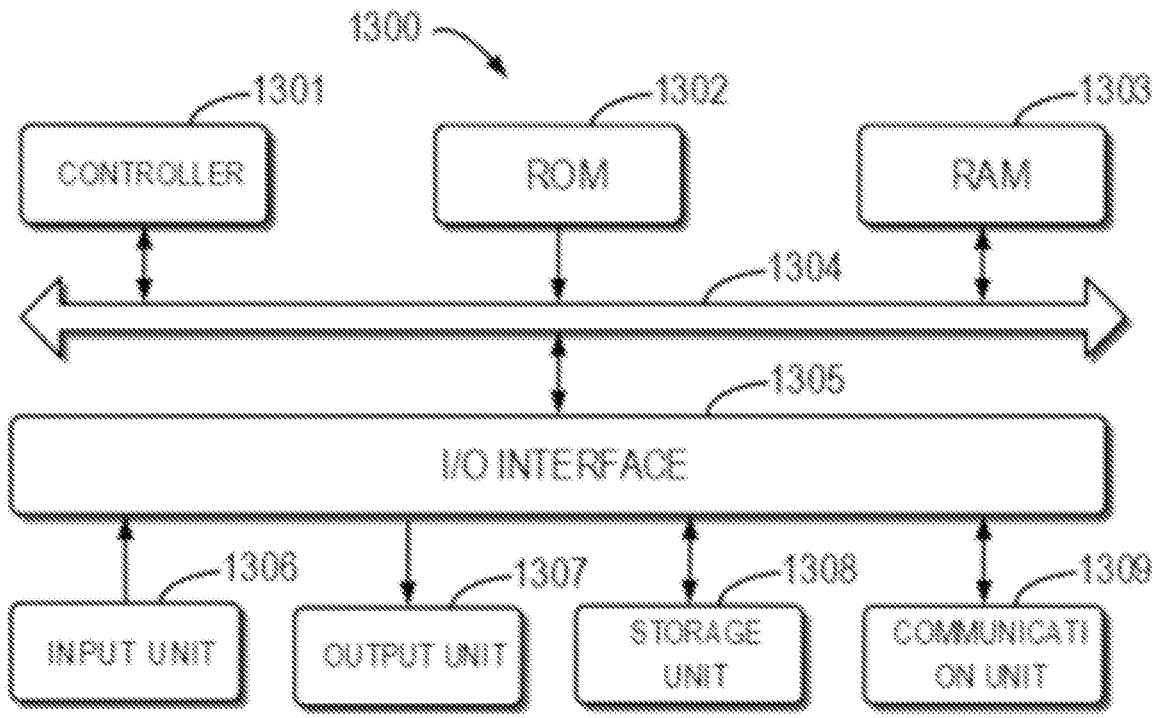
FIG. 12 illustrates an example of displaying filters to a user according to embodiments of the present disclosure.
FIG. 13 illustrates a schematic structure diagram of an electronic device according to embodiments of the present disclosure.

At block 1150, the search server calculates a score for each bucket, that is, priority of each filter and/or its candidate options. The calculated score will be used for determining whether the filter and/or its candidate options, and/or importance of the filter and/or its candidate options (that is, display priority) should be displayed to the user. For example, the calculation can be implemented by one or more of equations (1)-(10). At block 1160, the search server returns search results to the user. At block 1170, if the user discovers the required data in the search results, the search ends at block 1180; otherwise, the search server can determine, based on the calculated score (priority), the filter and/or its candidate options available for further search to be displayed to the user at block 1190. For example, the filter and/or its candidate options with a score lower than a threshold can be hidden and not displayed to the user. FIG. 12 illustrates an example of filters displayed to the user.

It should be noted that in some embodiments, the search server also can display the determined filter and/or its candidate options together with the search result to the user at block 1160. That is, the operation of block 1190 can be completed in the block 1160. Optionally, the search server can display to the user the number of search results hitting each filter and/or its candidate options.

At block 1191, the user selects a filter from dynamic filters provided by the search server to perform further search, thereby reducing the search results. As useless filters and candidate options are not displayed to the user, user's selection becomes more efficient and meaningful.

It should be noted that the cycle of 1130-1191 in FIG. 11 can be repeated many times to reduce the search results. In addition, the dynamic filter and its options provided by the search server also provide some clues to the user regarding distribution of search results, which will guide the user to find the desired data more efficiently.

The method proposed in the present disclosure can, for example but not limited to, generate a search filter for data protection products. The method according to some embodiments can reduce the amount of filters and options thereof, such that the user can efficiently select them to reduce the query results. Moreover, some embodiments also define how to analyze user's behaviors and consider them as feedback values to improve the determination of score/priority of a filter and/or options, and to determine the display sequence of the filter based on the score/priority.

It should be noted although some embodiments offer the equations (such as equations (1), (4) and (7)-(10)) for calculating the priority as examples, it should be understood that embodiments of the present disclosure are not limited to determining the priority by the shown equations.

Furthermore, some embodiments of the present disclosure are used for reducing useless filters and/or their options. Therefore, in some implementations, if a user is fully aware of how to make a choice, the predefined filters (and their complete options) still can be provided before the first query. The method for reducing the displaying options proposed in the present disclosure can be used in a subsequent further query/search, to facilitate reducing the search results. In some other embodiments, the filter may not be used in an initial search; instead, after the search result is acquired, the result is analyzed using the method proposed in the present disclosure and the filter is generated based on the analysis.

The method of embodiments of the present disclosure can be provided as a search function, for example (but not limited to), in desktop applications, mobile applications or websites, to improve user experience.

FIG. 13 illustrates a schematic block diagram of an electronic device 1300 for implementing the embodiments of the present disclosure. As shown in FIG. 13, the electronic device 1300 includes a controller or known as a processing unit (e.g., CPU) 1301, which can execute various suitable actions and processing based on the programs stored in a read-only memory (ROM) 1302 and/or a random-access memory (RAM) 1303. The ROM 1302 and/or RAM 1303 can store all kinds of programs and data required by the operations of the device 1300. The controller 1301, ROM 1302 and RAM 1303 are connected to each other via a bus 1304. In particular, the electronic device 1300 also includes one or more dedicated processing units (not shown), which also can be connected to the bus 1304.

The input/output (I/O) interface 1305 is also connected to the bus 1304. A plurality of components in the electronic device 1300 is connected to the I/O interface 1305, including: an input unit 1306, such as a keyboard, a mouse and the like; an output unit 1307, such as various kinds of displays and loudspeakers etc.; a storage unit 1308, such as a magnetic disk and an optical disk etc.; and a communication unit 1309, such as a network card, a modem, a wireless transceiver and the like. The communication unit 1309 allows the electronic device 1300 to exchange information/data with other devices via a computer network, such as Internet, and/or various telecommunication networks.

In some embodiments, the controller 1301 can be configured to execute each procedure and processing described above, such as method 400, 500, 800 or 1100. For example, in some embodiments, the method 400, 500, 800 or 1100 can be implemented as a computer software program tangibly included in a machine-readable medium, e.g., storage unit 1308. In some embodiments, the computer program can be partially or fully loaded and/or mounted to the electronic device 1300 via the ROM 1302 and/or the communication unit 1309. When the computer program is loaded to the RAM 1303 and executed by the controller 1301, one or more operations of the above described method 400, 500, 800 or 1100 can be implemented. Alternatively, the controller 1301 also can be configured in any other suitable manners to implement the above procedure/method in other embodiments.

In particular, the above described method and device with reference to FIGS. 2-13, according to the embodiments of the present disclosure, can be implemented as computer program products, which are tangibly stored on a non-transient computer-readable storage medium and include machine-executable instructions. The instructions, when executed, can enable the machine to fulfill each aspect according to the present disclosure.

The computer-readable storage medium can be a tangible apparatus that stores instructions utilized by the instruction executing apparatuses. The computer-readable storage medium can include, but not limited to, an electrical storage device, a magnetic storage device, an optical storage device, an electromagnetic storage device, a semiconductor storage device or any appropriate combinations of the above. More concrete and non-exhaustive examples of the computer-readable storage medium include: a portable computer disk, a hard disk, a random-access memory (RAM), a read-only memory (ROM), an erasable programmable read-only memory (EPROM or flash), a static random-access memory (SRAM), a portable compact disk read-only memory (CD-ROM), a digital disk (DVD), a memory stick, a floppy disk, a mechanical coding devices, a punched card stored with instructions thereon, or a projection in a slot, and any appropriate combinations of the above.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, by means of state information of the computer readable program instructions, an electronic circuitry including, for example, programmable logic circuitry, field-programmable gate arrays (FPGA), or programmable logic arrays (PLA)

can be personalized to execute the computer readable program instructions, thereby implementing various aspects of the present disclosure.

Aspects of the present disclosure are described herein with reference to flowchart and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

The descriptions of the various embodiments of the present disclosure have been presented for illustration purposes, but are not intended to be exhaustive or limited to the embodiments disclosed. Many modifications and variations will be apparent to those of skilled in the art without departing from the scope and spirit of the described embodiments.

We claim:

1. A method of servicing search requests, comprising:
in response to receiving a search request from a user, acquiring search results matching the search request;
determining a matching status between a predefined filter and the search results, the predefined filter being used for filtering search results, wherein determining the matching status between the predefined filter and the search results comprises:
determining the number of candidate options hit by the search results in the candidate options of the predefined filter, wherein determining the number of candidate options hit by the search results in the candidate options of the predefined filter comprises:
bucketing the search results, such that a search result matching a candidate option of the predefined filter is allocated to a bucket associated with the candidate option;
determining the number of search results allocated to each bucket; and
determining the number of buckets comprising at least one search result as the number of candidate options hit by the search results; and
controlling, based on the determined matching status, displaying of the predefined filter to the user, wherein controlling the displaying of the predefined filter to the user comprises:
determining, based on the number of the candidate options hit by the search results, a priority of the predefined filter;
controlling, based on the priority of the predefined filter, the displaying of the predefined filter to the user.

2. The method of claim 1, wherein determining the priority of the predefined filter comprises:
determining the number of candidate options of the predefined filter hit by the search results as a priority value of the predefined filter.

3. The method of claim 1, wherein determining the priority of the predefined filter comprises:
determining the priority of the predefined filter based on the number of candidate options hit by the search results and a historical behavior of the user for the candidate options of the predefined filter.

4. The method of claim 3, wherein determining the priority of the predefined filter comprises determining a priority value of the predefined filter as:

$$F\_Score = \sum_{i=1}^{n} (1 + \delta) g_{(N_i)}$$

where F_Score represents the priority value of the predefined filter, values "1" and "0" of $g_{(N_i)}$ indicate that an i-th candidate option of the predefined filter is hit and missed, respectively, n represents the number of candidate options of the predefined filter and δ represents an adjustment factor determined by the historical behavior of the user for candidate options of the predefined filter.

5. The method of claim 4, wherein $$\delta = \frac{1}{M} \sum_{i=1}^{m} \left( \frac{a}{T(i)} \right)$$

where M represents a length of a time window for making statistics of the historical behavior, m represents the number of actions of the user for candidate options of the filter within the time window, and i represents an index of the i-th action within the time window; a is a positive constant and T(i) represents a latency from the i-th action within the time window to the time when the priority of the predefined filter is determined.

6. The method of claim 5, wherein the actions of the user for candidate options of the filter comprises at least one selected from group consisting of displaying and clicking.

7. The method of claim 1, wherein controlling the displaying of the predefined filter to the user comprises:
when the priority of the predefined filter being greater than or equal to a first threshold, displaying the predefined filter to the user for further searching of the search result; and
when the priority of the predefined filter being less than the first threshold, determining to avoid displaying the predefined filter to the user.

8. The method of claim 1, wherein controlling the displaying of the predefined filter to the user comprises:
determining, based on the priority of the predefined filter, a display sequence of the predefined filter when being displayed to the user; and
displaying the predefined filter to the user in accordance with the determined display sequence.

9. The method of claim 1, wherein controlling the displaying of the predefined filter to the user comprises:
when the number of the search results acquired being greater than a threshold, controlling, based on the determined matching status, the displaying of the predefined filter to the user; and
in response to when the number of the search results acquired being less than or equal to the threshold, determining to avoid displaying the predefined filter to the user.

10. An electronic device, comprising:
at least one processor; and
at least one memory coupled to the at least one processor and including computer program codes stored therein, the computer program, when executed by the at least one processor, causing the electronic device to perform a method, the method comprising:
in response to receiving a search request from a user, acquiring search results matching the search request;

determining a matching status between a predefined filter and the search results, the predefined filter being used for filtering search results, wherein determining the matching status between the predefined filter and the search results comprises:
   determining the number of candidate options hit by the search results in the candidate options of the predefined filter, wherein determining the number of candidate options hit by the search results in the candidate options of the predefined filter comprises:
      bucketing the search results, such that a search result matching a candidate option of the predefined filter is allocated to a bucket associated with the candidate option;
      determining the number of search results allocated to each bucket; and
      determining the number of buckets comprising at least one search result as the number of candidate options hit by the search results; and
   controlling, based on the determined matching status, displaying of the predefined filter to the user, wherein controlling the displaying of the predefined filter to the user comprises:
      determining, based on the number of the candidate options hit by the search results, a priority of the predefined filter;
   controlling, based on the priority of the predefined filter, the displaying of the predefined filter to the user.

11. A computer storage medium including computer program codes stored thereon, the computer program codes, when executed in a processor, enabling the processor to perform a method, the method comprising:
   in response to receiving a search request from a user, acquiring search results matching the search request;
   determining a matching status between a predefined filter and the search results, the predefined filter being used for filtering search results, wherein determining the matching status between the predefined filter and the search results comprises:
      determining the number of search results hitting a candidate option of the predefined filter; and
   controlling, based on the determined matching status, displaying of the predefined filter to the user, wherein controlling the displaying of the predefined filter to the user comprises:
      determining, based on the number of search results hitting the candidate option, a priority of the candidate option; and
      controlling, based on the priority of the candidate option, the displaying of the candidate option of the predefined filter to the user.

12. The computer storage medium of claim 11, wherein determining the priority of the candidate option comprises:
   when the number of search results hitting a candidate option being greater than zero and less than a fourth threshold, determining a priority value of the candidate option as one of:
      1, x, and $$a1 \cdot e^{-\left(\frac{x-b1}{c1}\right)^2}$$

where x represents the number of search results hitting the candidate option, $e_{(\ )}$ represents an exponent operation, and each of a1, b1 and c1 is a configurable factors; and
   when the number of search results hitting the candidate option being equal to zero or being greater than or equal to the fourth threshold, determining the priority value h of the candidate option as 0.

13. The computer storage medium of claim 12, wherein determining the priority of the candidate option further comprises:
   adjusting, based on historical behaviors of the user for the candidate option of the predefined filter, the priority value of the candidate option.

14. The computer storage medium of claim 11, wherein adjusting the priority value of the candidate option comprises adjusting the priority value of the candidate option to:

$$O_{Score} = (1+\delta) \cdot h$$

where $O_{Score}$ represents an adjusted priority value of the candidate option, h represents a priority value of the candidate option before the adjustment and δ represents an adjustment factor determined by historical behaviors of the user for the candidate option of the predefined filter.

15. The computer storage medium of claim 14, wherein $$\delta = \frac{1}{M} \sum_{i=1}^{m} \left(\frac{a}{T(i)}\right)$$

where M represents a length of a time window for making statistics of the historical behaviors, m represents the number of actions of the user for candidate options of the filter within the time window, and i represents an index of the actions within the time window; a is a positive constant, and T(i) represents a latency from an i-th action within the time window to the time when the priority of the predefined filter is determined.

16. The computer storage medium of claim 11, wherein controlling the displaying of the candidate option to the user comprises:
   when the priority of the candidate option being greater than or equal to a second threshold, displaying the candidate option to the user for further searching of the search results; and
   when the priority of the candidate option being less than the second threshold, determining to avoid displaying the candidate option to the user.

17. The computer storage medium of claim 16, wherein displaying the candidate option to the user comprises:
   determining, based on the priority of the candidate option, a display sequence of the candidate option when being displayed to the user; and
   displaying the candidate option to the user in accordance with the display sequence determined.

\* \* \* \* \*